United States Patent [19]

Berger

[11] 4,082,691

[45] Apr. 4, 1978

[54] ORGANO SILICON/SILICA DEFOAMER COMPOSITIONS

[75] Inventor: Paul Daniel Berger, Missouri City, Tex.

[73] Assignee: Witco Chemical Corporation, New York, N.Y.

[21] Appl. No.: 744,480

[22] Filed: Nov. 24, 1976

Related U.S. Application Data

[63] Continuation-in-part of Ser. No. 433,622, Jan. 16, 1974, abandoned.

[51] Int. Cl.² .............................................. B01D 19/04
[52] U.S. Cl. .................................... 252/358; 252/321
[58] Field of Search ............................ 252/358, 321; 260/448.8 R, 448.2 R

[56] References Cited

U.S. PATENT DOCUMENTS

| | | | |
|---|---|---|---|
| 2,306,222 | 12/1942 | Patnode | 428/273 |
| 2,412,470 | 12/1940 | Norton | 427/314 X |
| 3,076,768 | 2/1963 | Boylan | 252/321 X |
| 3,408,306 | 10/1968 | Boylan | 252/321 |

*Primary Examiner*—Benjamin R. Padgett
*Assistant Examiner*—E. Suzanne Parr
*Attorney, Agent, or Firm*—Albert L. Gazzola; Morton Friedman

[57] ABSTRACT

A defoamer composition comprising a precipitated hydrophylic silica suspended in a water-immiscible inert liquid carrier, and reacted in situ with specific molar proportions of a trichloro-organosilane and a dichloro-organosilane, preferably in this respective order, to yield a stable hydrophobic silica suspension in an inert carrier, useful as a defoaming agent for aqueous systems, being effective at concentrations as low as 0.0005 percent. When one of said chloro-organosilanes contains an unsaturated bond, the composition may be further halogenated or sulfated.

11 Claims, No Drawings

ORGANO SILICON/SILICA DEFOAMER COMPOSITIONS

This application is a continuation-in-part of Ser. No. 433,622, filed Jan. 16, 1974 now abandoned.

This invention relates to unique precipitated silica based defoaming compositions which are useful for defoaming aqueous systems, particularly those difficult to defoam, and to a unique method of preparing the same.

Silica based defoamers are well known in the art and are described for instance, in U.S. Pat. No. 3,455,839 issued to Rauner on July 15, 1969; U.S. Pat. No. 3,267,042 issued to Domba on Aug. 16, 1966; U.S. Pat. No. 3,304,266, issued to Sullivan on Feb. 14, 1967; U.S. Pat. No. 3,015,645, issued to Tyler on Jan. 2, 1962; U.S. Pat. No. 3,388,073, issued to Domba on June 11, 1968; U.S. Pat. No. 3,076,768, issued to Boylan on Feb. 5, 1963 and U.S. Pat. No. 3,408,306, issued to Boylan on Oct. 29, 1968. The latter three patents are incorporated herein by reference. Specifically, the latter two patents, i.e. U.S. Pat. Nos. 3,076,768 and 3,408,306 disclose in part, defoamers derived from dichloroorganosilanes, whereby a hydrophylic silica such as silica aerogel, fumed silica, or precipitated silica is rendered hydrophobic by treatment with a dichloro-organosilane and thereafter dispersed in an organic liquid. U.S. Pat. No. 3,388,073 teaches the use of a cyclic silane defoamer made by reacting suspended silica particles, preferably fumed silica, with a dialkyl dihalo silane and water, to hydrolyze the dialkyl dihalo silane to dimethyl silane diol. By the present process, a precipitated silica is rendered hydrophobic by treating a suspension of the silica in a water-immiscible inert liquid carrier, and employing specific proportions of a trichloroorganosilane and a dichloro-organosilane, preferably in this respective order, to yield improved defoamers.

The present defoamers are capable of solving many industrial foam problems at surprisingly low concentrations, of as little as 0.0005% to about 0.8%, and preferably at concentrations of between 0.001–0.5%. Higher concentrations, although effective, become impractical. They are effective defoamers, particularly in aqueous systems wherein the foam is difficult to control, such as with industrial adhesive formulations. They are effective for an indefinite period of time, and exhibit superior compatibility characteristics. The present defoamers may be employed in various latex manufacturing operations including polymerization, transfer, monomer stripping, and effluent treatment. They are also useful in defoaming latex coatings and adhesive formulae without adverse side effects, at low concentrations, and are also applicable to the dispersion polymerization of rubbers and resins and water based ink formulations.

The present defoamers are made with only precipitated silicas, exclusive of other silicas, as stated hereinbefore. Fumed silica and silica aerogels are not effective and are not included in the present composition. As known in the art, precipitated silica is a very finely divided silica having an ultimate particle size of about 10–50 millimicrons and forms an agglomerated particle of 1–5 microns. Precipitated silicas have a surface area of about 100–350 M$^2$/g. They are prepared by the distabilization of a water soluble silica under conditions which do not permit formation of a gel structure, but rather cause the flocculation of silica particles into coherent aggregates such as, for instance, by the addition of sodium ions to a sodium silicate solution; by direct precipitation from silica sols, or by precipitations of calcium silicate and then replacing the calcium by treatment with an acid, as known in the art. Precipitated silicas are well known and may be purchased as staple items. It is an advantage of the present process, that the defoamers are prepared in a single operation in an inert carrier using inexpensive raw materials.

The mechanism of reaction, whereby the present defoamer composition, prepared from only precipitated silica suspended in an inert carrier, as disclosed herein, and the suspension is treated with an amount of trichloro-organosilane and dichloro-organosilane, is not completely understood. The fact remains, however, that the composition produced thereby is an improved defoamer which is stable, easily water dispersible and capable of solving difficult defoaming problems, not heretofore solvable, and at low concentrations. Although the chloro-organosilanes may be added in the reverse order, i.e. first the dichlorosilane and then the trichlorosilane, this order of addition is not preferred.

The present defoamers are prepared in one step by first dispersing the precipitated silica in the water immiscible liquid carrier. An amount of trichloro-organosilane is added, followed by an amount of dichloro-organosilane, each in an amount of between 10–50%, and preferably about 15–25%, based on the amount and particle size of the silica, in molar proportions of about 1:1 to 1:5 respectively, and preferably between 1:2 to 1:4. The amount of total added chloroorganosilanes is sufficient to react with substantially all the hydroxy groups on the precipitated silica, HCl gas being liberated during the reaction. It is surprising that the present compositions are more effective, and in low concentrations, than silica defoamer compositions derived from only dichlorosilanes, and those derived from only trichlorosilanes are poor defoamers, at best. Furthermore, from Table 1, it is clearly seen that the combination of organosilanes, according to the present invention gives an additive effect greater than the effect of the sum of the individual silanes.

The dichloro- and trichloro-organosilanes employed in the present invention are represented by the following formulae:

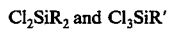

$Cl_2SiR_2$ and $Cl_3SiR'$ wherein R and R' may be alkyl or alkenyl, aryl, and alkaryl, such as methyl, ethyl, vinyl, propyl, decyl, dodecyl, heptadecyl, octadecyl, and the like, and may be straight or branch chain, cyclohexyl, phenyl, benzyl, and the like, and may be the same or different. Many of these chlorinated organosilanes may be purchased as staple items. In the present system commercially available dimethyldichlorosilane and methyl-vinyl dichlorosilane are the preferred dichlorosilanes, and $C_8$–$C_{20}$ trichlorosilanes, particularly methyl stearyl trichlorosilane and octadecyl trichlorosilane are preferred. When the organo moiety is represented by an unsaturated hydrocarbon, such as with methyl-vinyl dichlorosilane, it may be further halogenated or sulfated after reaction with the precipitated silica, to yield an even more improved defoamer. Halogenation may be accomplished by utilizing the HCl generated during the reaction, under pressure, as known in the art, and sulfation may be accomplished by adding $H_2SO_4$, as in the appended Example IV.

In practicing the present invention about 1–15% of precipitated hydrophylic silica is converted to a hydrophobic silica by first dispersing in an inert water-immiscible liquid, such as naphthenic or paraffinic mineral oil, kerosene, hexane, heptane, and the like. A quantity of trichloro-organosilane, in the range of 10–50% based on the silica, is then added to the suspension, followed by a quantity of the dichloro-organosilane, in the range of 10–50% based on the silica, in a molar proportion of about 1:1 to 1:5 respectively, keeping the temperature below about 50° C., and preferably below 40° C., during the additions so not to drive off the volatile chloroorganosilanes. Quantities of dichlorosilane much below 1 mol, based on the trichlorosilane, and more than 5 mols, produce unacceptable defoamers and are not part of the present invention. Ideally the amount of dichlorosilane employed, as stated above, is in the range of 2–4 mols, based on the trichloro-organosilane cotent. A molar proportion of 1:3 is the most preferred proportion. Alternatively, the silica may be added to the inert liquid carrier containing the trichloroorganosilane, and then the dichlorosilane is added, with similar results.

The reaction is usually completed in about 0.5–4.0 hours, mainly depending on the batch size. After completion, the reacted mixture is heated to about 100°–120° C. for a period of time to expel the HCl gas generated during the reaction.

When an unsaturated chloro-organosilane is employed, such a methyl vinyl dichlorosilane, as stated hereinbefore, it may be halogenated before expelling the liberated HCl, or sulfated after expelling the HCl, with $H_2SO_4$, to yield an even more effective defoamer.

An amount of an emulsifier is preferably added to the product, as known in the art, at a concentration of about 0.5 to 15% and preferably about 2–5%. The emulsifier may be anionic, cationic, or nonionic. Examples of suitable anionic emulsifiers, as known by the artisan, are fatty acids containing from about 12 to 22 carbon atoms such as stearic acid, and soaps of these fatty acids such as the alkali metal, alkaline earth metal, aluminum, ammonium and amine soaps, i.e. triethanolamine stearate, as well as rosin soaps. Examples of other suitable anionic emulsifing agents are alkali metal salts of alkyl-aryl sulfonic acids, sodium dialkyl sulfosuccinate, sulfated or sulfonated oils, e.g. sulfated castor oils, sulfonated tallow, and alkali metal salts of short chain petroleum sulfonic acids.

Examples of suitable cationic spreading agents are salts of long chain primary, secondary, or tertiary amines such as oleyl amine acetate, octyl amine acetate, didodecylamine lactate, and the like.

Examples of suitable nonionic emulsifing agents are condensation products of higher fatty alcohols with ethylene oxide, such as the reaction products of oleyl alcohol having 10 ethylene oxide units, condensation products of alkyl phenols with ethylene oxide, polyethylene glycol esters of long chain fatty acids and the like. Particularly preferred are the latter polyethylene glycol esters of fatty acids such as polyethylene glycol 400-ditallate.

The present defoamer compositions lend themselves to dilution with additional carrier, emulsification with water, or both.

The following examples are intended to illustrate specific embodiments of the present invention and are not intended to be limiting thereto.

EXAMPLE I

To three grams of precipitated silica dispersed in 100 grams of mineral seal oil is added 0.5 grams of octadecyltrichlorosilane followed by 0.35 grams of dimethyldichlorosilane, the temperature being maintained at below 40° C. The mixture is then heated to 110° C. until all the HCl has been evolved, as evidenced by a negative Congo Red test. 3.0 grams of Polyethylene glycol 400 (PEG 400) ditallate are next added and the mixture is allowed to cool to room temperature. This product has been found to be an effective defoamer in a wide variety of industrial applications among which are water based paints, adhesives, inks and cutting oils, monomer stripping, paper and pulp, and sugar beet processing.

EXAMPLE II

One hundred grams of a refined mineral oil is mixed with 13.4 grams of a precipitated silica. The mixture is heated to 40° C. 2.64 grams of octadecyltrichlorosilane is added followed by the slow addition of 2.64 grams methylvinyl dichlorosilane. The mixture is then heated to 110° C., then cooled to below 30° C. and 0.47 grams of concentrated sulfuric acid is added and the solution is stirred for 30 minutes, after which 1.88 grams of 50% aqueous sodium hydroxide is added. The product is mixed an additional five minutes and 12 grams of PEG 600 ditallate are added. This product has found widespread use as a defoamer for aqueous and non-aqueous systems especially inks, paints and adhesives.

EXAMPLE III

To 90.5 grams of mineral oil is added 4.76 grams of precipitated silica, with mixing, and 0.95 grams methylstearyl trichlorosilane is then added and the mixture is heated to 40° C. Then 0.95 grams dimethyl dichlorosilane is slowly added and the resulting solution is heated to 110° C. to remove the HCl evolved. 3 grams of PEG 400 di-oleate is added and the product is cooled. This product has also found widespread application in defoaming water based coatings, paper and pulp processing fluids and sugar beet processing streams.

The above products are used to solve many industrial foam problems where no solution previously existed. An example is the defoaming of an industrial adhesive formulation where other commercial products including silica based defoamers, lose effectiveness in a matter of hours, while the present silica based defoamers last for an indefinite period of time and exhibit superior compatibility characteristics. The products are also advantageous due to the easily available and inexpensive raw material used in their manufacture.

EXAMPLE IV

| Mineral Oil | 79.25% |
|---|---|
| Precipitated Silica | 10.4 |
| Octadecyltrichlorosilane | 3.0 |
| Methyl-vinyldichlorosilane | 2.0 |
| PEG 400 ditallate | 3.0 |
| Concentrated $H_2SO_4$ | 0.47 |
| NaOH (50% aq. w/w) | 1.88 |

Add the mineral oil to a dry glass-lined kettle equipped with a stirrer and a scrubber. Stir and heat to 40° C. Turn on scrubber. Add half of the trichlorosilane. Mix 5 minutes. Add remaining trichlorosilane and mix an additional five minutes. Add precipitated silica slowly and carefully so it is not carried up exhaust. Scrubber may need to be turned off during this addition. Mix until all the silica is wetted by the oil. Temperature may be raised to 50° C. but no higher, to facilitate wetting of silica. Adjust the temperature to 40° C. while adding the dichlorosilane slowly over a 15 minute period. Raise temperature to 110° C. and hold for 15 minutes. Cool to 30° C. and add the sulfuric acid, followed by the PEG 400 ditallate and mix 30 minutes. Then add the NaOH, mix 15 minutes, and drum.

| Appearance | Opaque liquid |
|---|---|
| Specific Gravity at 68/68° F. | 0.981 |
| Active Ingredients | 100% |
| pH | Weakly Alkaline |
| Weight per Gallon at 68° F. | 8.18 pounds |
| Flash Point (closed cup) | Above 250° F. |
| Dispersiblity | Water Dispersible |

This defoamer is used in the control of foam in manufacturing operations as well as the processes involved in the emulsion and dispersion polymerization of rubbers and resins. As a component of latex paints and adhesives, it effectively controls foam during manufacture and during application. It is also excellent for many water based ink formulas.

In monomer stripping, the amount of defoamer needed depends on the foaminess of the latex or dispersion, the stripping temperature, the amount of vacuum used, the stripping column configuration, and the method of defoamer addition. The quantity required can vary from 1 oz. to 1–2 pounds per 100 gallons. Usually, small quantities of defoamer are added to the flash tanks during degassing and additional defoamer is added as the latex enters the stripping column, or as it is sprayed into the stripping column, on demand, as foam builds up.

In batch operations, defoamer is allowed to cover the surface of the liquid in the reactor just prior to the release of pressure and application of vacuum to extract the unreacted monomers.

EXAMPLE V

| Mineral Oil | 92.50% |
|---|---|
| Precipitated Silica (Philadelphia Quartz) | 3.0 |
| Dimethyl-dichlorosilane | 1.50 |
| Octadecyl-trichlorosilane | 1.50 |
| PEG-400 Ditallate | 1.50 |

Charge the mineral oil to the reactor and turn on the agitator. Warm to 35°–40° C. and add the precipitated silica. Allow to mix until uniform. Holding the temperature at 35°–40° C. turn on the vacuum to the reactor but leave the manhole open so all the fumes will be swept to the scrubber. Add all the trichlorosilane and mix two or three minutes. Slowly add the dichlorosilane in small portions. Be sure the temperature is kept at less than 40° C. The liberated HCl gas will cause foaming in the product. Control the foaming by the rate of addition of the dichlorosilane while continuing agitation. Mix at about 40° C. until the foaming stops. Slowly heat to 110° C. to get rid of the HCl. If the reaction is complete there should be little foaming, then sparge with inert gas. Hold at 110° C. until the vapor over the product (with the vacuum off) does not turn moist Congo Red paper blue. When the Congo Red paper remains red, add the PEG-400 ditallate and mix 15 minutes. Cool the product and store.

| Appearance | Opaque Liquid |
|---|---|
| Specific Gravity at 68/68° F. | 0.90 |
| Temperature Stability | −10 to +120° F. |
| Active Ingredients | 100% |
| pH, 2% in 50/50 water/ethanol | 4–6 |
| Weight per gallon at 68° F. | 7.50 pounds |
| Flash Point, c.c. | 250° F. |
| Freezing Point | below −10° F. |
| Viscosity at 68° F. (cps) | 50 |

This defoamer is designed to control foam in various latex manufacturing operations including polymerization, transfer, monomer stripping, and effluent treatment. This product also defoams latex coating and adhesive formulas without adverse side effects, at concentrations of less than 0.4%.

The addition of one part per million to 0.5% defoamer based on the weight of the total formula, is recommended as a starting point.

In batch operations, the defoamer is added to the surface of the batch just prior to monomer stripping and is allowed to cover the surface of the batch. In continuous operations, the defoamer is added as the latex enters the stripping column or sprayed on demand onto the foam that is formed. For latex coating and adhesive formulating, usually half of the defoamer is added during initial mixing, and the remaining half is added during final viscosity adjustment.

EXAMPLE VI

Sugar beet diffusion juice of 17° Bx at 70° C. was purged with compressed air at the rate of 5.5 liters/min. through a capillary tube at the bottom of a jacketed 2 inch diameter × 3 foot glass column. The amount of various defoamers necessary to keep the foam height at 2 inches for 40 minutes was determined by adding the defoamer dropwise from a weighed syringe.

| PRODUCT | WEIGHT REQUIRED |
|---|---|
| Defoamer of Example V | 0.5007 grams |
| Defoamer of Example III | 0.3274 grams |
| Commercial Silica Defoamer A | 2.0756 grams |
| Commercial Silica Defoamer B | 1.8592 grams |
| Commercial Defoamer C | 1.3019 grams |
| Commercial Defoamer D | 1.6173 grams |

EXAMPLE VII

Sugar beet diffusion juice of 17° Bx at 70° C. was purged with compressed air at the rate of 5.5 liters/min. through a capillary tube at the bottom of a jacketed 2 inch diameter × 3 foot glass cylinder. Defoamer was administered through a septum near the bottom of the column using a constant rate syringe pump. The rate of addition of various defoamers necessary to keep the foam height of 500 cc of juice below 2 inches was determined.

| PRODUCT | ml/Hour Required |
|---|---|
| Defoamer of Example III | 0.057 |
| Defoamer of Example V | 0.40 |
| Commercial Silica Defoamer A | 1.62 |
| Commercial Silica Defoamer B | 1.62 |
| Commercial Defoamer C | 1.14 |
| Commercial Defoamer D | 1.85 |

EXAMPLE VIII

To 4.85 grams of precipitated silica in 100 grams of mineral seal oil is added the following respective amounts of octadecyltrichlorosilane and/or dimethyldichlorosilane as in Example I.

| Sample | Trichlorosilane | Dichlorosilane |
|--------|-----------------|----------------|
| A | 0.96 grams | 0.96 grams |
| B | 0.0 grams | 1.92 grams |
| C | 1.92 grams | 0.0 grams |
| *D | 1.72 grams | 0.2 grams |
| *E | 0.2 grams | 1.72 grams |
| F | Same as "A", added in reverse order | |

*0.2 grams concentration is below 10% based on the precipitated silica content and the molar proportion of trichlorosilane to dichlorosilane is outside the present claimed 1:1 to 1:5 molar proportions.

DEFOAMER TESTS

The compositions in Example VIII, A through F were tested as to defoaming properties in water-based adhesive, latex acrylic paint, paper black liquor, and sugar beet juice.

The water-based adhesive was treated with 0.5% of defoamer composition of Example VIII and mixed in a Hobart mixer for five minutes. The volume of foam produced as the percentage of liquid is recorded in the table below.

The latex acrylic paint was treated with 0.25% of defoamer composition of Example VIII and mixed in a paint can in a conventional paint shaker for 10 minutes.

The black liquor from a paper mill was treated with 0.20% defoamer composition of Example VIII, then heated to 70° C. and recirculated through a graduated column.

The sugar beet juice was treated with 0.005% defoamer composition of Example VIII and mixed, as was the black liquor at 70° C.

The volume of foam head was measured in each of the foregoing samples and recorded in the following table as volume percent of foam, based on volume of liquid.

TABLE 1

| Sample | Adhesive (Percent Foam) | Latex (Percent Foam) | Black Liquor (Percent Foam) | Sugar Beet Juice (Percent Foam) |
|--------|-------------------------|----------------------|-----------------------------|---------------------------------|
| A | 0.4 | 1.5 | 1.0 | 20.0 |
| B | 75.0 | 35.0 | 10.0 | 150.0 |
| C | 100.0 | 95.0 | 85.5 | 150.0 |
| D | 100.0 | 95.0 | 80.0 | 150.0 |
| E | 80.0 | 30.0 | 10.5 | 150.0 |

TABLE 1-continued

| Sample | Adhesive (Percent Foam) | Latex (Percent Foam) | Black Liquor (Percent Foam) | Sugar Beet Juice (Percent Foam) |
|--------|-------------------------|----------------------|-----------------------------|---------------------------------|
| F | 1.3 | 1.5 | 2.5 | 22.5 |

It is seen from the foregoing results that the trichlorosilane is substantially ineffective as a defoamer in the present formulation. The dichlorosilane, although better, is also not very effective. The combination of both the trichlorosilane and dichlorosilane, however, in the present defoamer composition, represents an excellent defoamer.

Similar defoamer results are obtained when substituting octyl, decyl, dodecyl, or hexadecyl trichlorosilane for octodecyl trichlorosilane in Example VIII.

I claim:

1. A defoamer silica composition comprising about 1-15% of a hydrophobic precipitated silica in a water-immiscible inert liquid carrier, said hydrophobic silica having been rendered hydrophobic by reaction of a hydrophylic precipitated silica in said suspension with a trichloro-organosilane and a dichloro-organosilane, and adding each of said chlorosilanes in an amount in the range of 10–50% based on the silica and in a molecular proportion of 1:1 to 1:5 respectively.

2. A defoamer composition as in claim 1 wherein the trichlorosilane is octadecyl trichlorosilane and the dichlorosilane is dimethyl dichlorosilane.

3. A defoamer composition as in claim 1 wherein the trichlorosilane is methylstearyl trichlorosilane and the dichlorosilane is dimethyl dichlorosilane.

4. A defoamer composition as in claim 1, wherein the trichlorosilane is octadecyl trichlorosilane and the dichlorosilane is methyl vinyl dichlorosilane.

5. A defoamer composition as in claim 1 wherein the molecular proportion of trichlorosilane to dichlorosilane is in the range of 1:2 to 1:4, respectively.

6. A defoamer as in claim 1 wherein the molecular proportion of trichlorosilane and dichlorosilane is about 1:3, respectively.

7. A defoamer composition as in claim 1 wherein the water-immiscible inert liquid carrier is a mineral oil.

8. A defoamer composition as in claim 1 wherein an emulsifier is present in an amount of from about 0.5 to 15%.

9. A defoamer as in claim 8 wherein said emulsifier is a polyethylene glycol fatty acid ester.

10. A defoamer composition as in claim 9, wherein said emulsifier is polyethylene glycol-400 ditallate.

11. A defoamer composition as in claim 4, further sulfated with sulfuric acid.

* * * * *